Nov. 10, 1942.   W. G. DAVIS   2,301,379
INDEXING OR SYNCHRONIZING APPARATUS
Filed April 16, 1941
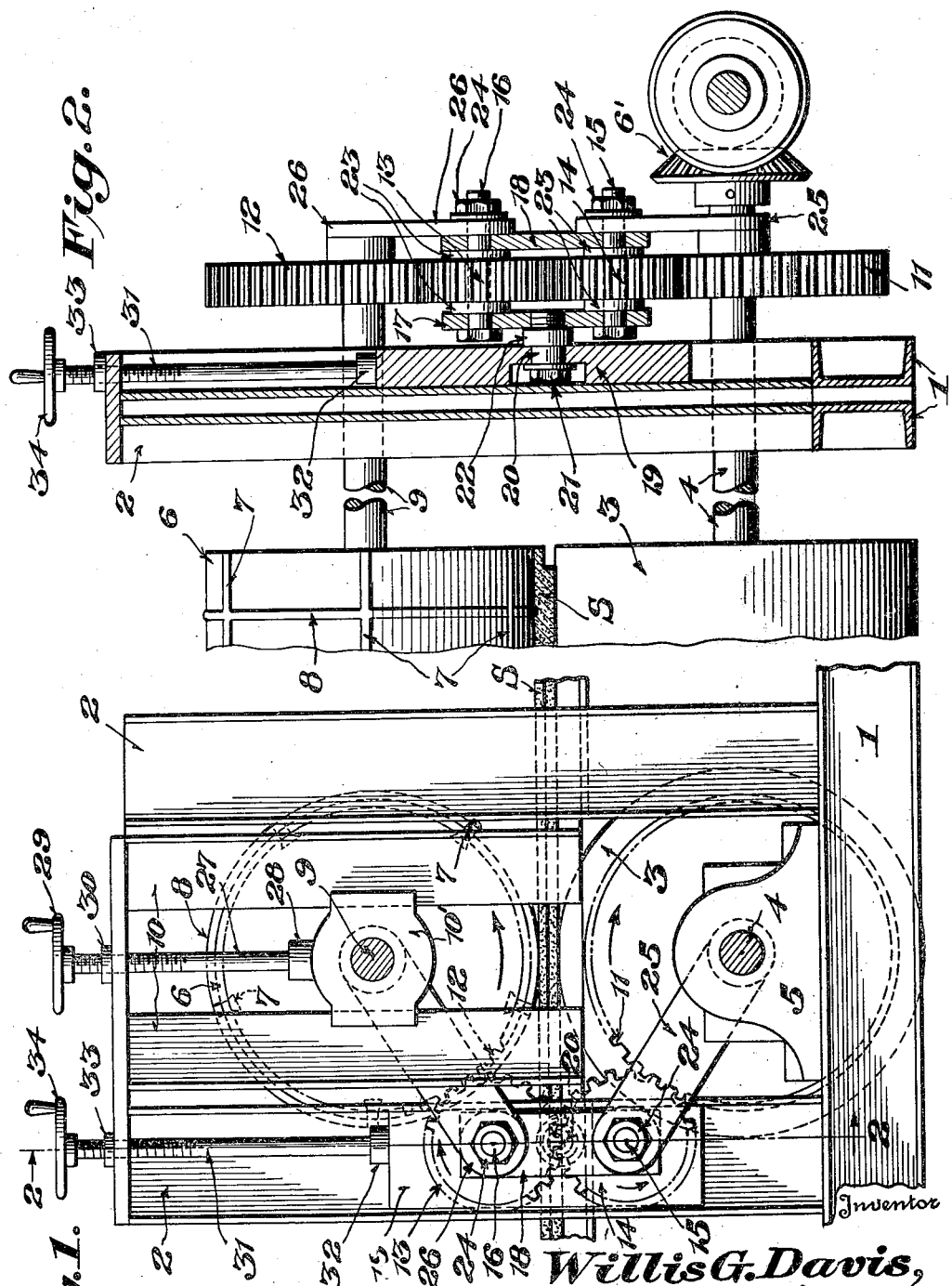
Inventor
Willis G. Davis,
By Ruess & Geier
Attorneys Patented Nov. 10, 1942

2,301,379

UNITED STATES PATENT OFFICE 2,301,379

INDEXING OR SYNCHRONIZING APPARATUS

Willis G. Davis, Pompton Plains, N. J.

Application April 16, 1941, Serial No. 388,907

13 Claims. (Cl. 101—248)

This invention relates to an indexing or synchronizing apparatus and more particularly to an apparatus employed for indexing or determining the position of or locating impressions or the like which simulate wire cut half bricks and the mortar lines that are impressed on siding units employed in buildings, especially in connection with the walls thereof.

The invention more particularly is employed in connection with the method and apparatus for producing and embossing siding disclosed in my application for patent filed April 16, 1941, Ser. No. 388,909.

The primary object of the invention is to provide an apparatus of this type which accurately and positively determines the position of or locates the cuts and mortar lines on the siding should the impression roller be out of time relative to the movement of the siding or material being embossed.

Further the invention aims to provide a mechanism of this type which can be operated to adjust the cuts and mortar lines or other embossing during the movement of the siding through the machine, or otherwise stated without stopping the machine.

Still further the invention aims to provide an apparatus of the type set forth wherein the adjustment can be effected to a fine degree.

The invention further aims to provide an indexing apparatus which can be easily and quickly manipulated within the vision of the operator, and also one which embodies a minimum of parts compactly related and positive in their operation.

The invention has still further and other objects which will be later set forth and of themselves manifested in the course of the following description.

In the drawing:

Fig. 1 is a side elevation of the invention, partly broken away and in section; and Fig. 2 is a section on line 2—2 of Fig. 1.

In proceeding in accordance with the invention a frame is provided having a base 1, and a pair of spaced vertical uprights 2, which are formed of channeled bars. A lower roll or roller 3 is carried by a shaft 4, journaled in a bearing 5 mounted on base 1, and is driven or rotated in any suitable manner, for example, by the mitered gearing 6'.

The impression or embossing roller is designated 6 and has means 7 and 8 to produce the mortar simulating joints and cuts on a face of the siding. The roll 6 is secured to a shaft 9.

A pair of guides 10 are affixed to the uprights 2, and support bearings 10 in which the shaft 9 is journaled, for sliding vertical movements so as to provide for adjustment of the space between the rolls to not only accommodate siding of varying thickness, but also to enable the pressure exerted on opposite faces of the siding S to be regulated as required to assure feed of the latter.

A gear 11 is keyed on shaft 4 and a like gear 12 is keyed on shaft 9, the gears unvaryingly meshing with the respective smaller gears 13 and 14 which are intermeshed and journaled on stub shafts 15 and 16, the latter being carried at their ends by links 17 and 18, which thereby connect the stub shafts. The inner link 17 is pivotally connected to a slide 19 mounted for vertical movements in one of the vertical channel bars 2 by means of a stud 20 threaded at one end into the slide and at its opposite end secured by a nut 21. To maintain the link 17 spaced from the slide 19, a collar 22 is formed on the stud, and to likewise maintain the links 17 and 18 spaced from the gearing, washers 23 are mounted on the stub shafts which latter are held in place by bolts 24.

A pair of relatively convergent arms 25 and 26 are pivoted at their outer ends on the shafts 4 and 9 and at their inner ends on the stub shafts 15 and 16 respectively.

For the purpose of effecting the desired adjustment of the impression roll or roller 6, a screw 27 is connected at its lower end to a member 28 carried by bearing 10, in any well known manner, to permit rotation of the screw while still preventing longitudinal movement thereof relative to the bearing. The screw is provided with a hand wheel 29 and is threaded through a nut 30 or the like affixed to the top of the frame. A second like screw 31 has similar connection with a member 32 connected to the slide 19 and with a nut 33 or the like also secured to the top of the frame, the screw 31 likewise having a hand wheel 34 secured thereto.

In operation, the roll 3 is driven in a clockwise direction which causes its gear 11, to drive the gear 14 in a counterclockwise direction thereby causing gear 13 to be driven clockwise and roll 6 through its gear 12, counterclockwise. By manipulation of the screw 27 the desired adjustment and pressure on the material S is effected to assure its progressive feed and the scoring thereon by the embossers, or scorers or markers 7 and 8.

If the lines marked by the scorers 7 and 8 are not properly located or positioned, the operator then rotates the screw 31 either clockwise or counterclockwise, as conditions may require. This rotation of the screw 31, effects corresponding vertical movement of the slide 19 and through the arms 25 and 26, rocking of the links 17 and 18 on the pivotal pin 20, thus varying the relation of the small gears 13 and 15 to the large gears 11 and 12 whereby the impression or embossing elements 7 and 8 of the impression roller are adjusted so that any misalinement of the impressions relative to the length of the siding or material is corrected.

Thus, from the foregoing, it will be seen that in the event that the impression roller is out of time with respect to the movement of a siding unit between same and the underlying pressure roller either upward or downward movement of the slide 19 will shift the upper roller carrying the embossing members either in a clockwise or counterclockwise direction so as to bring the impression or embossing elements into their indexed positions with respect to the length of the board, which action can be accomplished even though the machine is in operation, and regardless of the adjustment of the rollers to vary the space therebetween according to the thickness of the material to be embossed.

It will also be apparent that the invention is applicable to the control of operations other than embossing or decorating such as printing, cutting, blocking out patterns or the like, in fact can be used for the indexing of any material or object wherein synchronization while in motion is required, even to the control of the timing points in engine cylinders.

Obviously the invention also is susceptible for use with any materials to be embossed or decorated in any manner, and that the same is subject to all changes, alterations or modifications as may fall within its spirit as announced by the following claims.

What is claimed is:

1. An indexing apparatus including a frame, an impression roller and a second roller opposing the impression roller journaled on the frame and between which rollers material to be embossed is passed, a gear connected to each roller, a pair of arms each pivoted at one end to the respective roller journals, intermeshing gears journaled on the opposite ends of the respective arms and meshed with the respective roller gears, a vertically movable slide carried by the frame, means to adjust the slide, means pivoted to the slide, and means to connect the journals of the gears of the arms to the pivoted means whereby upon movement of the slide to shift the impression roller in a clockwise or counterclockwise direction according to the movement of the slide.

2. An indexing apparatus in accordance with claim 1, wherein the pivoted means consists of a pair of links arranged on opposite sides of the intermeshing gears and one of which is pivoted to the slide.

3. An indexing apparatus including a frame, an impression roller and a second roller opposing the impression roller journaled on the frame and between which rollers material to be embossed is passed, a gear connected to each roller, a pair of intermeshing gears meshed with the respective roller gears, means to mount the intermeshing gears for pivotal movement relative to the respective axes of rotation of the rollers, pivoted means carrying the intermeshing gears, and means to effect bodily movement of the last-named pivoted means whereby to selectively shift the impression roller in a clockwise or counterclockwise direction.

4. An indexing apparatus in accordance with claim 3, wherein the means to effect bodily movement of the last-named pivoted means includes a vertically movable slide and means to adjustably move and hold the slide subsequent to adjustment.

5. An indexing apparatus for shifting an impression roller so as to predeterminately time the impressions relative to the movement of the material, including an impression roller, a feed roller cooperating with the impression roller and between which rollers the work is fed, means to adjust the space between the rollers to provide for the reception therebetween of material of varying thicknesses, means having constant unvarying engagement with the rollers to shift the impression roller in a clockwise or counterclockwise direction to time the impressions relative to the movement of the material, and means to selectively adjust said shifting means whereby to vary the said timing of the impressions while said shifting means maintains its said constant and unvarying engagement with the rollers.

6. An indexing apparatus in accordance with claim 5, wherein the adjustment of the shifting means is operable during the movement of the impression roller.

7. An indexing apparatus in accordance with claim 5, wherein the shifting means includes pivoted means, wherein there is a rotary means operated by and having constant engagement with each of the rollers and carried by the pivoted means, wherein the rotary means are operated one from the other, and wherein there is means to effect bodily adjustment of the pivoted means.

8. An indexing apparatus in accordance with claim 5, wherein the shifting means includes a pivoted member, wherein there is a pair of rotary means respectively carried by and located on opposite sides of the pivot of the pivoted member and which rotary means are operated one from the other, and wherein there is an adjustable slide having connection with the pivot of the pivoted member to bodily move the latter.

9. An indexing apparatus for shifting an impression roller so as to predeterminately time the impressions relative to the movement of the material, including an impression roller, a feed roller cooperating with the impression roller and between which rollers the work is fed, pivoted means, rotary means carried by the pivoted means having driving engagement with each other and having engagement with each of the rollers to be actuated thereby, means to govern the pivotal movement of the pivoted means, and means to effect bodily shifting movement of the pivoted means and therewith the rotary means whereby to selectively shift the impression roller in a clockwise or counterclockwise direction.

10. An indexing apparatus in accordance with claim 9, wherein the means to govern the movement of the pivotal means includes links pivoted to the pivoted means and also pivoted at points in register with the respective axes of rotation of the rollers.

11. An indexing apparatus for shifting an impression roller so as to predeterminately time the impressions relative to the movement of the material, including an impression roller, a second roller between which and the impression roller the material is engaged, means to operate the rollers, means having constant and unvarying engagement with the operating means to adjust the space between the rollers whereby to provide for embossment of material of varying thicknesses, and means for rotating the impression roller in either a clockwise or counterclockwise direction, in all positions thereof to which it is capable of being adjusted with relation to said second roller whereby to vary the timing of the impressions relative to the material.

12. An indexing apparatus for shifting an impression so as to predeterminately time the impressions relative to the movement of the material, including an impression roller, a feed roller cooperating with the impression roller and between which rollers the work is fed, pivoted means, shifting means including rotary means carried by the pivoted means and operated one from the other and operated by the rollers to shift the impression roller in a clockwise or counterclockwise direction to time the impressions relative to the movement of the work, means to control the pivotal movement of the pivoted member, and means to bodily move said shifting means and therewith the pivoted means whereby to vary the said timing of the impressions.

13. An indexing apparatus for shifting an impression so as to predeterminately time the impressions relative to the movement of the material, including an impression roller, a feed roller cooperating with the impression roller and between which rollers the work is fed, means operable by the rollers to shift the impression roller in a clockwise or counterclockwise direction to time the impressions relative to the movement of the work including a pivoted member, a pair of rotary means respectively carried by and located on opposite sides of the pivot of the pivoted member, and operated one from the other, means to govern the pivotal movement of the pivoted member, an adjustable slide having connection with the pivoted member to bodily shift the latter thereby to vary the said timing of the impressions, and means to actuate the slide.

WILLIS G. DAVIS.